United States Patent [19]
Larkin et al.

[11] 4,183,846
[45] Jan. 15, 1980

[54] ORGANOTIN STABILIZER COMPOSITION

[75] Inventors: William A. Larkin, Morristown; Robert C. Ringwood, Jr., Sewaren, both of N.J.

[73] Assignee: M&T Chemicals Inc., Woodbridge, N.J.

[21] Appl. No.: 142,007

[22] Filed: May 10, 1971

Related U.S. Application Data
[63] Continuation-in-part of Ser. No. 709,910, Mar. 4, 1968, abandoned.

[51] Int. Cl.$^2$ .............................................. C08K 5/58
[52] U.S. Cl. .............................. 260/45.75 S; 252/406
[58] Field of Search .................. 252/406; 260/45.75 S

[56] References Cited
U.S. PATENT DOCUMENTS

| | | | |
|---|---|---|---|
| 2,641,588 | 6/1953 | Leistner et al. | 260/45.75 |
| 2,746,946 | 5/1956 | Weinberg et al. | 260/45.75 |
| 3,424,717 | 1/1969 | Gottlieb et al. | 260/45.75 |

*Primary Examiner*—V. P. Hoke
*Attorney, Agent, or Firm*—Kenneth G. Wheeless; Robert Spector

[57] ABSTRACT

In accordance with certain of its aspects, this invention relates to stabilizing compositions; to stabilized polymers; and to the process for preparing a novel halogen-containing polymer stabilized against the deteriorative effect of heat which comprises adding to a halogen-containing resin a stabilizing amount of: a first stabilizer having the formula RSn(SR')$_3$ wherein R is selected from the group consisting of methyl, butyl and octyl radicals and R' is a residue of a carboxylic acid ester derived from acetic or propionic acid and a monohydric alcohol containing between 8 and 12 carbon atoms or a dodecyl hydrocarbon radical; and a second stabilizer of the formula R"$_2$Sn=S wherein R" represents a monovalent hydrocarbon radical selected from the group consisting of methyl and butyl radicals.

8 Claims, No Drawings

ORGANOTIN STABILIZER COMPOSITION

This application is a continuation-in-part of our application Ser. No. 709,910, filed Mar. 4, 1968 now abandoned.

BACKGROUND OF THE INVENTION

This invention relates to a method for stabilizing halogen-containing polymers including poly(vinyl chloride) and to novel stabilized halogen-containing polymer compositions.

As is well known to those skilled-in-the-art, various halogen-containing organic polymers, particularly vinyl halide polymers which include homopolymers of vinyl chloride and copolymers of vinyl chloride with other monomers, may degrade when subjected to heat over an extended period of time as evidenced by darkening of the resin and by an increase in brittleness. These defects may render the resin unsuitable for many uses since the darkening produces an unsightly appearance, and the increased brittleness may cause mechanical failures. A wide variety of materials has heretofore been employed to stabilize halogen-containing polymers. Many of these additives have achieved some measure of success in stabilizing halogen-containing resins against the degradative action of heat, but there are many applications in which a greater degree of heat stability is desired than has heretofore been readily attainable.

It is particularly characteristic of prior art stabilizing systems that they may not fully prevent the deterioration of resins or polymers including poly(vinyl chloride) during the period when the resins and stabilizer composition may be maintained on the hot mill on which they are blended. During this period, which may be from 5 to 30 minutes or longer, the various ingredients including e.g. pigment, plasticizer, stabilizer, lubricant, etc. may be mixed with the resin and the mixture subjected to the influence of heat and pressure to form a substantially homogeneous mixture. During this period of severe heating (typically at 175° C. or higher), the resin may deteriorate much more quickly than under normal processing or handling conditions. Thus the product coming from the Banbury Mill-Blender or extruder may be darker than is desirable.

Those skilled-in-the-art have heretofore attempted to eliminate this deterioration resulting from heat by addition of various materials including auxiliary heat stabilizers. It has been found, however, that the presence of these additional materials results in undesirable side effects which may unsatisfactorily modify the desired properties of the resin or polymer. Accordingly, it has heretofore not been possible to prepare resin compositions which may be stabilized in a totally satisfactory manner against the deteriorative effect of heat.

It is an object of this invention to provide a method for stabilizing halogen-containing organic polymer or resin compositions, particularly vinyl halide polymers, against heat deterioration. It is a further object of this invention to provide novel stabilized halogen-containing polymers. Other objects will be apparent to those skilled-in-the-art from inspection of the following description.

SUMMARY OF THE INVENTION

In accordance with one of its aspects, this invention relates to a novel halogen-containing vinyl polymer composition stabilized against the deteriorative effect of heat comprising a halogen-containing resin and effective amounts of: a first stabilizer having the formula $RSn(SR')_3$ wherein R is selected from the group consisting of methyl, butyl, and octyl radicals and R' is (1) a residue of a carboxylic acid ester derived from acetic or propionic acid and a monohydric alcohol containing not less than 8 or more than 12 carbon atoms or (2) a dodecyl hydrocarbon radical; and a second stabilizer of the formula $R''_2Sn\!=\!S$ wherein R'' represents a monovalent hydrocarbon radical selected from the group consisting of methyl and butyl radicals.

This invention also provides novel, improved stabilizer compositions suitable for stabilizing halogen-containing vinyl polymers against the deteriorative effects of heat, said composition comprising a first stabilizer which is a monoalkyltin tris-mercaptide or tris-mercaptocarboxylate represented by the formula $R(SnSR')_3$ and a second stabilizer which is a dialkyltin sulfide represented by the formula $R''_2Sn\!=\!S$ wherein R, R', and R'' are as defined hereinbefore.

DETAILED DESCRIPTION OF THE INVENTION

The polymers or resins which may be stabilized by practice of this invention may be halogen-containing organic polymers, typically those which contain chlorine atoms bonded to the polymer chain. These polymers may be homopolymers including polyvinyl chloride-type polymers, e.g. poly(vinyl chloride), poly(vinylidene chloride), etc. They may also include copolymers formed by the copolymerization of vinyl chloride or vinylidene chloride with other ethylenically unsaturated monomers. Ethylenically unsaturated monomers may be compounds which contain polymerizable carbon-to-carbon double bonds and may include acrylates such as acrylic acid, ethyl acrylate, acrylonitrile, etc.; vinyl monomers such as styrene, vinyl acetate, etc.; maleates such as maleic acid, maleic anhydride, maleate esters, etc. For convenience, reference will be hereinafter made to vinyl chloride polymers.

The polymers may be either "rigid" or "flexible." When "rigid" polymers are employed, they may include impact modifiers, pigments and/or fillers, lubricants etc., in addition to the resin and stabilizer. When "flexible" polymers are employed, they may include plasticizer (primary and secondary), pigments and/or fillers, lubricants, etc. in addition to the resin and stabilizer.

The second member of the stabilizer pairs of this invention is represented by the formula $R''_2Sn\!=\!S$, wherein R'' represents a monovalent hydrocarbon radical selected from the group consisting of methyl and butyl radicals. The compounds made or purchased under the foregoing formula e.g. dibutyltin sulfide, may exist in a polymeric form, i.e. $(R''_2SnS)_m$ wherein m represents an integer not less than about 3. The formula $R''_2SnS$ is used for simplicity, it being understood that this formula includes polymers, monomers, or mixtures thereof.

The hydrocarbon radicals of the first and second stabilizers represented by R, R' and R'' in the foregoing formulae, may contain inert substituents which do not adversely affect the performance of the compounds as stabilizers. Suitable inert substituents include but are not limited to: alkoxy radicals, e.g. ethoxy aryl hydrocarbon radicals, e.g. phenyl radicals containing non-labile halogen, e.g. chlorophenyl and o-, m-or p-chlorobenzyl.

The first and second stabilizers are present in stabilizing amounts. Typically the first stabilizer RSn(SR')$_3$ may be used in amount of 0.1-10 parts by weight per 100 parts by weight of halogen-containing, typically vinyl chloride, resins. Preferably it may be used in the amount of 0.1-3, preferably 1.0 parts per 100 parts of halogen-containing resin.

Typically the second stabilizer R"$_2$Sn=S may be employed in the amount of 0.05-5 parts by weight per 100 parts by weight of halogen-containing resin. Preferably the amount used may be about 0.05-2.0, say 0.4 parts by weight of halogen-containing resin.

The weight of the first stabilizer is preferably not less than about twice the weight of the second stabilizer.

The novel heat stable compositions of this invention may be formulated by such techniques as milling, dry blending, Banbury blending, or any other commonly employed formulating techniques.

One of the formulating methods which may be particularly convenient involves the formation of a stabilizer composition containing the first stabilizer, the second stabilizer, and auxiliary additives (including antioxidants, etc.). This stabilizer composition may later be added to, and thoroughly mixed with the vinyl chloride polymer. Where this technique is employed, the stabilizer composition may typically comprise stabilizing amounts of the stabilizers, typically 0.1-10 parts by weight of the second stabilizer. Preferably, it may comprise about 0.05-2, say 0.4 parts of the second stabilizer.

Whatever formulating technique be employed, it will be desirable to substantially completely and uniformly disperse the first stabilizer, the second stabilizer and any auxiliary additives (including anti-oxidants, etc.) throughout the vinyl chloride polymer composition.

It is a feature of the novel stabilizer systems of this invention that it permits attainment of stabilized halogen-containing polymers and resins, particularly vinyl halide polymers such as vinyl chloride characterized by their resistance to the deteriorative effect of heat. The degrees of stabilization attained in such systems may be considerably in excess of that previously attainable by any prior art stabilizer system.

Because of the outstanding properties of this novel stabilizer system, it is possible to effect stabilization with lower quantities and thereby to obtain a more effective system on a cost-performance basis.

In order to point up clearly the novel features of this invention and to illustrate the unexpected and outstanding results which may be attained by practice of this invention, the following illustrative examples may be set forth wherein all parts are parts by weight unless otherwise indicated.

In these examples, the rigid vinyl chloride polymer employed was that having a specific gravity of 1.40, a Shore Durometer "D" hardness of 80 and an ultimate tensile strength of about 7,000 psi sold under the trademark Geon 103 EP, (or equivalent, e.g. Diamond 450 Brand).

The selected compositions were thoroughly blended by placing the poly(vinyl chloride) on a two-roller differential mill which was oil-heated to a temperature of 175° C. together with the noted quantity of first and second stabilizers, and the mixture was milled for about 5 minutes. A continuous band of the composition formed around one of the rollers. This band was cut and the composition was removed from the hot roller as a continuous sheet. Squares of this material measuring 2.54 cm×2.54 cm were cut for heat stability testing.

For the heat stability test, the squares were placed in an air oven regulated to maintain a temperature of 190° C. Samples of each composition were removed from the oven at 15 minute intervals and were rated visually as to color change and degradation according to the following scale:

7—clear, water-white
6—off-white
5—slightest degree of yellowing
4—definite yellow color
3—deep yellow-brown color
2—deep brown color
1—dark brown to black color The length of time in minutes required to reach a value of 3 or less was recorded as the Heat Stability Value.

The stabilizer compositions evaluated and the results of the heat stability tests are summarized in the following examples, which represent preferred embodiments of this invention and should not be interpreted as limiting the scope thereof.

EXAMPLE 1 (Control, no stabilizers present)

Heat stability value (H.S.V.)—0, (adhered to mill rollers after about 1 minute).

EXAMPLE 2 (Control)

First stabilizer—butyl tris(iso-octyl mercaptoacetate)—1.5 parts (per 100 parts of resin)
Second stabilizer—none
H.S.V.—60 minutes
Color after milling—7

EXAMPLE 3 (Control)

First stabilizer—butyltin tris(iso-octyl mercaptopropionate)—1.5 parts
Second stabilizer—none
H.S.V.—60 minutes
Color after milling—7

EXAMPLE 4 (Control)

First stabilizer—butyltin tris(dodecyl mercaptide) (1.5 parts)
Second stabilizer—none
H.S.V.—60 minutes
Color after milling—5

EXAMPLE 5 (Control)

First stabilizer—octyltin tris(iso-octyl mercaptoacetate) (1.5 parts)
Second stabilizer—none
H.S.V.—45 minutes
Color after milling—7

EXAMPLE 6 (Control)

First stabilizer—methyltin tris(iso-octyl mercaptopropionate) (1.5 parts)
Second stabilizer—none
H.S.V.—60 minutes
Color after milling—7

EXAMPLE 7

First stabilizer—methyltin tris(dodecyl mercaptide)
Second stabilizer—none
H.S.V.—30 minutes
Color after milling—6

EXAMPLE 8 (Control)

First stabilizer—none
Second stabilizer—dibutyltin sulfide (1.5 parts)
H.S.V.—15 minutes
Color after milling—4

EXAMPLE 9 (Control)

First stabilizer—none
Second stabilizer—dimethyltin sulfide (1.5 parts)
H.S.V.—45 minutes
Color after milling—7

The following Table I sets forth the improved heat stability values obtained using combinations of the foregoing first and second stabilizers. The numbers in parentheses after to parts by weight per 100 parts of resin.

TABLE I

| FIRST STABILIZER | SECOND STABILIZER | H.S.V. (MINUTES) | COLOR AFTER MILLING |
|---|---|---|---|
| Ex. 2 (1.0) | Ex. 8 (0.5) | 75 | 7 |
| Ex. 3 (1.0) | Ex. 8 (0.5) | 75 | 7 |
| Ex. 4 (1.0) | Ex. 8 (0.5) | 60 | 6 |
| Ex. 5 (1.0) | Ex. 8 (0.5) | 60 | 7 |
| Ex. 6 (1.0) | Ex. 8 (0.5) | 75 | 7 |
| Ex. 7 (1.0) | Ex. 8 (0.5) | 60 | 6 |
| Ex. 3 (1.0) | Ex. 9 (0.5) | 75 | 7 |

The stabilizer pairs of this invention are considered to be synergistic, as may be concluded from the data presented in Table I. When a portion of a relatively effective stabilizer, e.g. a monorganotin mercaptide or mercaptocarboxylate, is replaced by a relatively poor one, e.g. a diorganotin sulfide, the heat stabilization imparted to the resin composition is markedly superior to that obtained using either stabilizer alone.

Although this invention has been illustrated by specific examples, changes therein which clearly fall within the scope of the invention will be apparent to those skilled in the art. The invention is, therefore, to be limited solely by the scope of the appended claims.

We claim:

1. A novel polymer composition stabilized against the deteriorative effects of heat, comprising (1) a polymer selected from the group consisting of homopolymers of vinyl chloride, vinylidene chloride and copolymers of vinyl chloride or vinylidene chloride with at least one ethylenically unsaturated monomer and (2) between 0.1 and 15% by weight, based on said polymer of a two-component stabilizer wherein the first component exhibits the general formula RSn(SR')$_3$ R' represents a dodecyl hydrocarbon radical or a radical of the formula

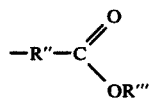

wherein R" represents an ethylene or a propylene radical and R'" represents a monovalent hydrocarbon radical containing not less than 8 nor more than 12 carbon atoms, with the proviso that the weight ratio of said first component to said second component is between 2:1 and 20:1.

2. The polymer composition of claim 1 wherein the first stabilizer is selected from the group consisting of butyltin tris(iso-octyl mercaptoacetate), butyltin tris(iso-octyl mercaptopropionate), butyltin tris(dodecyl mercaptide), octyltin tris(iso-octyl mercaptoacetate), methyltin tris(iso-oxtyl mercaptopropionate), and methyltin tris (dodecyl mercaptide).

3. A polyvinyl chloride resin composition in accordance with claim 1 in which the polyvinyl chloride resin is polyvinyl chloride homopolymer.

4. A polyvinyl chloride resin composition in accordance with claim 1 in which the amount of stabilizer composition is within the range from about 0.25% to about 15% by weight of the composition.

5. A novel two-component stabilizing composition for protecting homopolymers of vinyl chloride, vinylidene chloride and copolymers of these compounds with other ethylenically unsaturated monomers against the deteriorative effects of heat, wherein the first component exhibits the general formula RSn(SR')$_3$ and the second component exhibits a formula selected from the group consisting of $(C_4H_9)_2Sn=S$ and $(CH_3)_2Sn=S$; R is selected from the group consisting of methyl butyl and octyl radicals; R' represents a dodecyl hydrocarbon radical or a radical of the formula

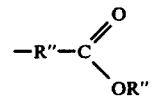

wherein R" represents an ethylene or a propylene radical and R'" represents a monovalent hydrocarbon radical containing not less than 8 nor more than 12 carbon atoms, with the proviso that the weight ratio of said first component to said second component is between 2:1 and 20:1.

6. The novel stabilizing composition of claim 5 wherein the first stabilizer is selected from the group consisting of butyltin tris(iso-octyl mercaptoacetate), butyltin tris(iso-octyl mercaptopropionate), butyltin tris(dodecyl mercaptide), octyltin tris(iso-octyl mercaptoacetate), methyltin tris(iso-octyl mercaptopropionate), and methyltin tris(dodecyl mercaptide).

7. A stabilizer composition in accordance with claim 5, in which the organotin sulfide is dibutyl tin sulfide and the organotin mercaptocarboxylic acid ester is monobutyl tin or monooctyl trin tris (isooctyl mercaptoacetate).

8. A stabilizer composition according to claim 5, in which the organotin mercaptocarboxylic acid ester is monobutyl tin tris(isooctyl mercaptoacetate) and the organotin sulfide is dibutyl tin sulfide.

UNITED STATES PATENT OFFICE
CERTIFICATE OF CORRECTION

Patent No. 4,183,846          Dated January 15, 1980

Inventor(s) William A. Larkin and Robert C. Ringwood, Jr.

It is certified that error appears in the above-identified patent and that said Letters Patent are hereby corrected as shown below:

Claim 1, line 9 - Following the formula "$RSn(SR')_3$" insert --and the second component exhibits a formula selected from the group consisting of $(C_4H_9)_2Sn=S$ and $(CH_3)_2Sn=S$; R is selected from the group consisting of methyl, butyl and octyl radicals; --.

Signed and Sealed this

Third Day of March 1981

[SEAL]

Attest:

RENE D. TEGTMEYER

Attesting Officer      Acting Commissioner of Patents and Trademarks